US011859097B2

(12) United States Patent
Kim

(10) Patent No.: US 11,859,097 B2
(45) Date of Patent: Jan. 2, 2024

(54) FUNCTIONAL AQUEOUS PAINT COMPOSITION HAVING INCOMBUSTIBILITY, FLAME RESISTANCE, HEAT SHIELDING, HEAT INSULATION AND DEW CONDENSATION PREVENTION EFFECTS

(71) Applicant: Green Solution LLC, Pearce, AZ (US)

(72) Inventor: Kwang Hwan Kim, Goyang-si (KR)

(73) Assignee: Green Solution LLC, Pearce, AZ (US)

( * ) Notice: Subject to any disclaimer, the term of this patent is extended or adjusted under 35 U.S.C. 154(b) by 798 days.

(21) Appl. No.: 16/976,080

(22) PCT Filed: Feb. 28, 2019

(86) PCT No.: PCT/KR2019/002402
§ 371 (c)(1),
(2) Date: Aug. 27, 2020

(87) PCT Pub. No.: WO2019/168361
PCT Pub. Date: Sep. 6, 2019

(65) Prior Publication Data
US 2021/0040336 A1    Feb. 11, 2021

(30) Foreign Application Priority Data

Feb. 28, 2018    (KR) ........................ 10-2018-0024663

(51) Int. Cl.
| C08K 3/04 | (2006.01) |
| C08K 3/105 | (2018.01) |
| C08K 3/22 | (2006.01) |
| C08K 3/26 | (2006.01) |
| C08K 3/30 | (2006.01) |
| C08K 5/00 | (2006.01) |
| C08K 5/49 | (2006.01) |
| C08L 1/02 | (2006.01) |
| C09D 123/08 | (2006.01) |
| C09D 133/08 | (2006.01) |
| C09D 163/00 | (2006.01) |
| C09D 5/18 | (2006.01) |
| C09D 7/61 | (2018.01) |
| C08K 7/24 | (2006.01) |
| C09D 5/00 | (2006.01) |
| C09D 7/65 | (2018.01) |
| C09D 7/40 | (2018.01) |
| C09D 133/00 | (2006.01) |
| C08L 1/26 | (2006.01) |
| C09D 131/04 | (2006.01) |

(52) U.S. Cl.
CPC ............ *C09D 133/08* (2013.01); *C08K 3/04* (2013.01); *C08K 3/26* (2013.01); *C08K 5/49* (2013.01); *C08K 7/24* (2013.01); *C09D 5/00* (2013.01); *C09D 5/18* (2013.01); *C09D 7/61* (2018.01); *C09D 7/65* (2018.01); *C09D 7/70* (2018.01); *C09D 123/0853* (2013.01); *C09D 133/00* (2013.01); *C09D 163/00* (2013.01); *C08K 3/105* (2018.01); *C08K 3/22* (2013.01); *C08K 3/30* (2013.01); *C08K 2003/2241* (2013.01); *C08K 2003/265* (2013.01); *C08K 2003/3045* (2013.01); *C08K 2201/005* (2013.01); *C08L 1/26* (2013.01); *C09D 7/40* (2018.01); *C09D 131/04* (2013.01)

(58) Field of Classification Search
CPC .......... C09D 133/08; C09D 5/00; C09D 5/18; C09D 7/61; C09D 7/65; C09D 7/70; C09D 123/0853; C09D 133/00; C09D 163/00; C09D 7/40; C09D 131/04; C09D 123/08; C08K 3/04; C08K 3/26; C08K 5/49; C08K 7/24; C08K 3/105; C08K 3/22; C08K 3/30; C08K 2003/2241; C08K 2003/265; C08K 2003/3045; C08K 2201/005; C08K 5/00; C08L 1/26; C08L 33/04; C08L 63/00
See application file for complete search history.

(56) References Cited

U.S. PATENT DOCUMENTS

2012/0309886 A1    12/2012    Park et al.

FOREIGN PATENT DOCUMENTS

| JP | 2015-000815 A | 1/2015 |
| KR | 10-0963656 B1 | 6/2010 |
| KR | 100963656 B1 * | 6/2010 |
| KR | 10-0996720 B1 | 11/2010 |
| KR | 20110086663 A * | 7/2011 |
| KR | 101110704 B1 * | 2/2012 |
| KR | 10-1450265 B1 | 10/2014 |
| KR | 101450265 B1 * | 10/2014 |
| KR | 20150024910 * | 2/2015 |
| KR | 10-1497942 B1 | 3/2015 |

(Continued)

OTHER PUBLICATIONS

KR101110704B1, machine translation (Year: 2012).*

(Continued)

*Primary Examiner* — Anthony J Green
*Assistant Examiner* — Marites A Guino-O Uzzle
(74) *Attorney, Agent, or Firm* — Revolution IP, PLLC

(57) ABSTRACT

A paint composition has incombustibility, flame resistance, heat shielding, heat insulation, water resistance and dew condensation prevention effects, thereby being effectively usable as a finishing, heat insulating, water resistant and incombustible material for buildings, and has a significantly thick film thickness even if applied only once, thereby being rapidly and conveniently usable when applied.

3 Claims, 2 Drawing Sheets

(56) References Cited

FOREIGN PATENT DOCUMENTS

KR 10-1735067 B1 5/2017

OTHER PUBLICATIONS

KR20150024910, machine translation (Year: 2015).*
KR100963656B1, machine translation (Year: 2010).*
KR101450265B1, machine translation (Year: 2014).*
KR20110086663A, machine translation (Year: 2011).*
International Search Report for PCT/KR2019/002402 dated Jun. 27, 2019 from Korean Intellectual Property Office.

* cited by examiner

[FIG. 1]

[FIG. 2]

ously used as fire-retardant materials for steel structures, there is a problem that workers are exposed to smell and fire hazards during the application of the paints.

FUNCTIONAL AQUEOUS PAINT COMPOSITION HAVING INCOMBUSTIBILITY, FLAME RESISTANCE, HEAT SHIELDING, HEAT INSULATION AND DEW CONDENSATION PREVENTION EFFECTS

TECHNICAL FIELD

The present invention relates to a functional water-based paint composition having fire-retardant, flame-retardant, heat-shielding, thermal insulation, and anti-condensation effects and a method of preparing the same, and more particularly, to a water-based paint composition applicable as a fire-retardant material, a thermal insulation material, and a waterproofing material and a method of preparing the same.

BACKGROUND ART

In general, paints allow objects being painted to have a beautiful color and become beautiful by imparting a variety of colors and gloss to the objects, and the coatings impart functions of beautifying and preserving the environment to the painted objects by maintaining the beauty of the objects and give the objects special functions such as electrical insulation, antibacterial, antiseptic, fire prevention, and heat resistance functions. Although there are various types of paints, the paints can be largely classified into water- and oil-based paints, and both groups have unique characteristics and uses.

Although outer walls are typically finished using water-based paints, water-based paints do not have sufficient water resistance for performing a waterproofing function, and the coatings are damaged or fall off due to atmosphere environments (e.g., rainwater) and thus should be reapplied at regular intervals at additional costs. In addition, since it is required that water repellents are applied on top of water-based paints every two to three years to impart a waterproofing function to the paints, a cost burden is incurred. Although, alternatively, oil-based paints may be applied to ensure the water resistance of the paint applied to an outer wall and prevent the penetration of rainwater, the use of oil-based paints is limited due to the risk of fire, the condition of the base surface, the regulation of harmful organic compounds, and the like. In addition, when using an oil-based paint for repair work, it is often necessary to apply the paint after removing all of the existing coatings because the paint may damage the existing film formed of a water-soluble coating waterproofing agent. In addition, some oil-based waterproofing agents have a problem in that the agents may form a rubber film on the surface, blocking the ventilation between inside and outside, thereby causing mold on the wall.

In order to overcome these problems, water-soluble waterproofing paints have been developed, but some water-soluble waterproofing paints recently being used do not have good enough breathability for releasing the moisture inside due to the nature of their compositions or have the problem that when used for repair work, depending on the type of material of the existing exterior finish, the applied paint may fall off due to a decrease in adhesion.

Meanwhile, since thermal insulation materials commonly used in buildings are exposed to the risk of fire and have the disadvantage of taking up much space, paints having a thermal insulation function have been developed, but the existing thermal insulation paints have the problem that the paints do not exhibit sufficient thermal insulation performance for providing the desired thermal insulation effect. In addition, due to the nature of paints, it is not easy to realize a sufficient coating thickness for producing a thermal insulation effect, and since it is necessary to apply coatings several tens of times, significant economic and time losses are incurred.

Meanwhile, in line with the recent reinforcement of fire regulations, regulations on fire-retardant construction materials have been strengthened, and the requirement for paints to have fire-retardant characteristics is accordingly increasing. However, due to the nature of paints which have small thicknesses, buildings or steel structures exposed to flames for a long time cannot be protected, and in the case of oil-based paints which have been conventionally used as fire-retardant materials for steel structures, there is a problem that workers are exposed to smell and fire hazards during the application of the paints.

Therefore, there has been an increasing need to develop functional paints having a fire-retardant, heat-shielding, moisture absorption, or anti-condensation function.

DISCLOSURE

Technical Problem

The present invention is directed to providing a functional water-based paint composition which is usable not only as a paint finish but also as a fire-retardant material, a thermal insulation material for improving thermal efficiency, an anti-condensation material for preventing condensation caused by a temperature difference, and a waterproofing material, and a method of preparing the same.

Technical Solution

One aspect of the present invention provides a paint composition including a main raw material and a liquid raw material in the weight ratio of 1:1, wherein the main raw material includes calcium sulfoaluminate ($3Ca_3Al_2O_3CaSO_4$) having a fineness of 6,000 to 12,000 $cm^2/g$ at 10 to 30 wt %, expandable graphite at 20 to 40 wt %, calcium carbonate ($CaCO_3$) passed through a 325 mesh at 10 to 40 wt %, a foaming agent at 1 to 2 wt %, a fluidizing agent at 0.1 to 1 wt %, a preservative at 0.1 to 1 wt %, an antifoaming agent at 0.1 to 1 wt %, hydroxymethyl cellulose or methyl cellulose having a viscosity of 5,000 to 30,000 cP at 0.01 to 0.5 wt %, anhydrous gypsum at 10 wt % or less, a microporous ceramic having a particle size of 325 mesh or less at 30 wt % or less, a phosphorus-based flame retardant at 20 wt % or less, and $TiO_2$ at 5 wt % or less, and the liquid raw material includes one or a mixture of two or more of an epoxy resin, an ethylene-vinyl acetate (EVA) resin, and an acrylic resin at 20 to 50 wt % and water at 50 to 80 wt %.

Another aspect of the present invention provides a method of preparing a paint composition, which includes: a) preparing a main raw material by mixing, based on the total weight of the main raw material, calcium sulfoaluminate ($3Ca_3Al_2O_3CaSO_4$) having a fineness of 6,000 to 12,000 $cm^2/g$ at 10 to 30 wt %, expandable graphite at 20 to 40 wt %, calcium carbonate ($CaCO_3$) having a particle size of 325 mesh or less at 10 to 40 wt %, a foaming agent at 1 to 2 wt %, a fluidizing agent at 0.1 to 1 wt %, a preservative at 0.1 to 1 wt %, an antifoaming agent at 0.1 to 1 wt %, hydroxymethyl cellulose or methyl cellulose having a viscosity of 5,000 to 30,000 cP at 0.01 to 0.5 wt %, anhydrous gypsum at 10 wt % or less, a microporous ceramic having a particle size of 325 mesh or less at 30 wt % or less, a phosphorus-based flame retardant at 20 wt % or less, and $TiO_2$ at 5 wt % or less; b) preparing a liquid raw material by mixing, based on the total weight of the liquid raw material, one or more selected from the group consisting of an epoxy resin, an EVA resin, and an acrylic resin at 20 to 50 wt % and water at 50 to 80 wt %; and c) mixing the main raw material and the liquid raw material at the weight ratio of 1:1.

Advantageous Effects

A functional water-based paint composition of the present invention is a paint composition having improved thermal insulation and fire-retardant properties and added waterproofing properties. Therefore, the paint composition has enhanced fire-retardant properties, and by having a waterproofing effect and preventing condensation due to having excellent thermal insulation and heat-shielding effects, it enables the cost of cooling and heating to be reduced.

In addition, since the paint composition ensures a desired thickness even when applied only once, the disadvantage that the existing paints cannot form enough thickness with one-time application can be compensated for, and there is an economic advantage.

DESCRIPTION OF DRAWINGS

FIGS. 1 and 2 are certified test reports issued by the Korea Testing & Research Institute, which show that a paint composition of the present invention has thermal insulation and heat-shielding effects.

MODES OF THE INVENTION

Hereinafter, specific exemplary embodiments of the present invention will be described in more detail.

Prior to describing the present invention, it should be noted that the following description of specific structures or functions is merely illustrative and provided only for the purpose of describing embodiments according to the concept of the present invention, and that the embodiments according to the concept of the present invention may be implemented in various forms and should not be construed as being limited to the exemplary embodiments described in the present specification.

In addition, the embodiments according to the concept of the present invention may be variously modified and may be implemented in various forms, and specific exemplary embodiments will be described in detail in the present specification. However, there is no intention to limit the embodiments according to the concept of the present invention to the specific disclosure forms, and it should be understood that all modifications, equivalents, and substitutes included in the spirit and technical scope of the present invention are encompassed.

In the present invention, there is provided a functional water-based paint composition, which has been researched and developed to have enhanced fire-retardant properties and have a waterproofing effect and prevent condensation by having excellent thermal insulation and heat-shielding effects.

For this, one aspect of the present invention provides a paint composition including a main raw material and a liquid raw material in the ratio of 1:1, wherein the main raw material includes calcium sulfoaluminate ($3Ca_3Al_2O_3CaSO_4$) having a fineness of 6,000 to 12,000 $cm^2$/g at 10 to 30 wt %, expandable graphite at 20 to 40 wt %, calcium carbonate ($CaCO_3$) passed through a 325 mesh at 10 to 40 wt %, a foaming agent at 1 to 2 wt %, a fluidizing agent at 0.1 to 1 wt %, a preservative at 0.1 to 1 wt %, an antifoaming agent at 0.1 to 1 wt %, hydroxymethyl cellulose or methyl cellulose having a viscosity of 5,000 to 30,000 cP at 0.01 to 0.5 wt %, anhydrous gypsum at 10 wt % or less, a microporous ceramic having a particle size of 325 mesh or less at 30 wt % or less, a phosphorus-based flame retardant at 20 wt % or less, and $TiO_2$ at 5 wt % or less, and the liquid raw material includes one or a mixture of two or more of an epoxy resin, an EVA resin, and an acrylic resin at 20 to 50 wt % and water at 50 to 80 wt %.

The paint composition of the present invention includes, among the above-described inorganic additives, an inorganic additive exhibiting a hydraulic reaction in order to compensate for the disadvantage that the existing paints cannot form enough thickness with one-time application.

The paint composition of the present invention includes calcium sulfoaluminate or alumina cement as an inorganic binder and may further include anhydrous gypsum in order to ensure the hardness and waterproofing properties of a paint and the adhesion to an object to be painted and maintain an application thickness. In this case, the inorganic binder may increase paint hardness by being hydrated by water, realize excellent waterproofing properties by reacting with water and a resin, and maintain a thickness by forming a hydrate.

The paint composition of the present invention includes expandable graphite in order to have a thermal insulation effect and particularly to prevent the generation of smoke from a fire. When exposed to heat of 200° C. or more, the expandable graphite may expand and thus prevent flames from being transmitted to a building or structure, thereby providing protection for the building or structure.

The paint composition of the present invention includes a foaming agent in order to improve foaming performance.

The paint composition of the present invention includes a microporous ceramic fired and foamed at high temperature in order to achieve thermal superinsulation properties. In this case, the microporous ceramic may be fired and foamed at a temperature of 1,200 to 1,400° C. When firing is performed at a temperature below the above-described temperature range, the ceramic may be insufficiently fired or very slowly fired. On the other hand, when firing is performed at a temperature above the above-described temperature range, the unnecessarily high temperature may lead to high energy loss and adversely affect the firing device.

The paint composition of the present invention includes a resin for the effect of enhancing the adhesion to an object to be painted and improving waterproofing properties by reacting with the inorganic binder included in the composition of the present invention. In particular, when used for a steel structure or the like, that is, when sufficient adhesion is required, the paint composition may include a two-component epoxy resin, and when used for a concrete building or when moderate adhesion is required, the paint composition may include a one-component EVA resin or acrylic resin.

According to one embodiment of the present invention, the paint composition of the present invention includes one or a mixture of two or more of the above-described resins.

The paint composition of the present invention includes a flame retardant in order to prevent the resin included in the composition of the present invention from being affected by flames and improve fire-retardant properties.

The paint composition of the present invention includes an antifoaming agent, a fluidizing agent, a preservative, and the like as additives.

The antifoaming agent is added to suppress the generation of foam which causes surface defects, such as cratering or the weakening of coating, in a dry coating, and serves to control the amount of gas and reduce air bubbles. Accordingly, the effects of ensuring quality stability and improving strength are provided. In the present invention, for example, AGITAN 295, AGITAN P803, AGITAN P833, or the like which is generally known may be used as the antifoaming agent, but the present invention is not limited thereto, and any of various other types of antifoaming agents may be used.

The fluidizing agent, which is a blending agent used for softening a paint by improving the flow characteristics of the paint, is added to disperse particles in the paint composition and serves to improve fluidity while maintaining the quality of the prepared paint composition by forming a lubricating film between particles and thereby reducing the adhesion between components. In addition, the fluidizing agent increases the levelness of a resulting lubricating film and improves workability in forming the lubricating film. In the present invention, for example, CMC/PC, Peramin SMF 30, Peramin CONPAC 149S, or the like which is generally known may be used as the fluidizing agent, but the present invention is not limited thereto, and any of other types of fluidizing agents may be used.

In addition, the preservative is added to increase the preservability of the product.

The paint composition of the present invention may further include a general pigment in order to impart color to the paint, and the pigment may be an organic or inorganic pigment and may be a black or colored pigment.

Hereinafter, the present invention will be described in more detail by way of exemplary embodiments. However, the exemplary embodiments are merely illustrative of the present invention, and it will be apparent to those of ordinary skill in the art that the scope of the present invention is not construed as being limited by the exemplary embodiments.

Example 1

Preparation of Functional Water-Based Paint Composition

For the preparation of a functional water-based paint composition of the present invention, a main raw material was prepared by mixing high-fineness calcium sulfoaluminate ($3Ca_3Al_2O_3CaSO_4$) satisfying a fineness of 6,000 to 12,000 $cm^2/g$ at 25 wt %, anhydrous gypsum at 7 wt %, a microporous ceramic fired and foamed at 1,300° C. and passed through a 325 mesh at 20 wt %, expandable graphite at 30 wt %, calcium carbonate ($CaCO_3$) passed through a 325 mesh at 9 wt %, a foaming agent at 1.5 wt %, a phosphorus-based flame retardant at 5 wt %, a fluidizing agent at 0.2 wt %, a preservative at 0.1 wt %, $TiO_2$ at 2 wt %, an antifoaming agent at 0.18 wt %, and methyl cellulose satisfying a viscosity of 5,000 to 30,000 cP at 0.02 wt %.

Subsequently, a liquid raw material for the functional water-based paint composition of the present invention was prepared by mixing an acrylic resin at 40 wt % and water at 60 wt %.

The prepared main raw material and liquid raw material were mixed at the ratio of 1:1, and thereby the functional water-based paint composition of the present invention was finally obtained.

Experimental Example 1

Evaluation of Thermal Insulation Effect

In order to confirm that the functional water-based paint composition prepared according to one exemplary embodiment of the present invention has a thermal insulation effect, the thermal insulation effect was evaluated by the Korea Testing & Research Institute in accordance with KS L 9016:2010 (flat-plate heat flux sensor method). The results are shown in FIG. 1.

Referring to FIG. 1, it can be confirmed that the functional water-based paint composition of the present invention has an excellent thermal insulation effect, by having a thermal conductivity of 0.078 W/(m·K).

Experimental Example 2

Evaluation of Heat-Shielding Effect

In order to confirm that the functional water-based paint composition prepared according to one exemplary embodiment of the present invention has a heat-shielding effect, solar radiation reflectance was evaluated by the Korea Testing & Research Institute in accordance with KS L 2514:2011. The results are shown in FIG. 2.

Referring to FIG. 2, it can be confirmed that the functional water-based paint composition of the present invention has an excellent heat-shielding effect, by having a solar radiation reflectance of 91.5%.

Experimental Example 3

Evaluation of Fire-Retardant Properties

In order to confirm that the functional water-based paint composition prepared according to one exemplary embodiment of the present invention has fire-retardant properties, the fire-retardant properties were evaluated by the KS F ISO 1182 test, which is a method for testing the fire-retardant properties of building materials.

As a result, it was determined that the functional water-based paint composition of the present invention is a first-grade fire retardant.

Experimental Example 4

Comparison of Coating Thickness According to Number of Coatings and Thermal Insulation Effect The coating thicknesses formed by the one-time application of a coating and thermal insulation effects of the functional water-based paint composition prepared according to one exemplary embodiment of the present invention and commercially available thermal insulation waterproofing paint compositions were evaluated and compared.

In the case of the paint composition of the present invention, a thickness of about 10 mm was ensured even with the one-time application of a coating. On the other hand, in the case of the paint compositions commercially available from Company A and Company B, it was only possible to ensure a thickness of 10 mm when the paint compositions were applied 17 times and 18 times, respectively.

In addition, in order to compare the thermal insulation effects of the paint compositions upon obtaining a thickness of 10 mm, thermal conductivity was evaluated by the Korea Testing & Research Institute in accordance with KS L 9016:2010 (flat-plate heat flux sensor method).

The results of evaluating the number of coatings and thermal conductivity of the paint composition of the present invention and the paint compositions commercially available from Company A and Company B applied to a thickness of 10 mm are shown in the following Table 1.

TABLE 1

| Classification | Example 1 | Company A | Company B |
| --- | --- | --- | --- |
| Number of coatings to reach 10 mm thickness | 1 | 17 | 18 |
| Thermal conductivity (units: N/(m · K)) | 0.65 | 0.74 | 0.68 |

Referring to Table 1, it can be confirmed that in the case of the functional water-based paint composition of the present invention, it is possible to achieve, even with the one-time application a coating, the coating thickness only obtainable by applying the existing paint compositions several times and have excellent thermal insulation and heat-shielding effects.

The invention claimed is:

1. A paint composition comprising a main raw material and a liquid raw material in the weight ratio of 1:1,
    wherein the main raw material includes:
    calcium sulfoaluminate ($3Ca_3Al_2O_3CaSO_4$) having a fineness of 6,000 to 12,000 $cm^2/g$ at 10 to 30 wt %;
    expandable graphite at 20 to 40 wt %;
    calcium carbonate ($CaCO_3$) passed through a 325 mesh at 10 to 40 wt %;
    a foaming agent at 1 to 2 wt %;
    a fluidizing agent at 0.1 to 1 wt %;
    a preservative at 0.1 to 1 wt %;
    an antifoaming agent at 0.1 to 1 wt %;
    hydroxymethyl cellulose or methyl cellulose having a viscosity of 5,000 to 30,000 cP at 0.01 to 0.5 wt %;
    anhydrous gypsum at 10 wt % or less;
    a microporous ceramic having a particle size of 325 mesh or less at 30 wt % or less;
    a phosphorus-based flame retardant at 20 wt % or less; and
    $TiO_2$ at 5 wt % or less, and
    the liquid raw material includes:
    one or a mixture of two or more of an epoxy resin, an ethylene-vinyl acetate (EVA) resin, and an acrylic resin at 20 to 50 wt %; and
    water at 50 to 80 wt %.

2. The paint composition of claim 1, wherein the microporous ceramic is fired and foamed at a temperature of 1,200 to 1,400° C.

3. A method of preparing a paint composition, comprising:
    a) preparing a main raw material by mixing, based on the total weight of the main raw material, calcium sulfoaluminate ($3Ca_3Al_2O_3CaSO_4$) having a fineness of 6,000 to 12,000 $cm^2/g$ at 10 to 30 wt %, expandable graphite at 20 to 40 wt %, calcium carbonate ($CaCO_3$) having a particle size of 325 mesh or less at 10 to 40 wt %, a foaming agent at 1 to 2 wt %, a fluidizing agent at 0.1 to 1 wt %, a preservative at 0.1 to 1 wt %, an antifoaming agent at 0.1 to 1 wt %, hydroxymethyl cellulose or methyl cellulose having a viscosity of 5,000 to 30,000 cP at 0.01 to 0.5 wt %, anhydrous gypsum at 10 wt % or less, a microporous ceramic having a particle size of 325 mesh or less at 30 wt % or less, a phosphorus-based flame retardant at 20 wt % or less, and $TiO_2$ at 5 wt % or less;
    b) preparing a liquid raw material by mixing, based on the total weight of the liquid raw material, one or more selected from the group consisting of an epoxy resin, an EVA resin, and an acrylic resin at 20 to 50 wt % and water at 50 to 80 wt %; and
    c) mixing the main raw material and the liquid raw material at the weight ratio of 1:1.

* * * * *